Patented Jan. 29, 1946

2,393,740

UNITED STATES PATENT OFFICE 2,393,740

PREPARATION OF ACROLEIN DIACYLATES

Joseph H. Brant and Frederick R. Conklin, Kingsport, Tenn., assignors to Eastman Kodak Company, Rochester, N. Y., a corporation of New Jersey No Drawing. Application May 1, 1943,
Serial No. 485,346

3 Claims. (Cl. 260—488)

This invention relates to the preparation of acrolein diacylates. It is known that acrolein diacetate can be prepared by adding sulfuric acid to a mixture of acrolein and acetic anhydride (Wohl and Maag, Ber. 43, 3293, 1910). In this process a yield of 64 percent is reported. During the reaction, the temperature rises rapidly and the reaction mixture becomes boiling hot, so that the process must be carried out in apparatus equipped with an efficient condenser to prevent loss of reactants and reaction products.

We have now found that acrolein diacetate, as well as other diacylates, can be prepared in higher yields than are obtainable by the Wohl and Maag process by adding acrolein to a mixture of carboxylic anhydride and catalyst at a temperature of not more than 10° C. Moreover, we have found that α-alkylacrolein diacylates, β-alkylacrolein diacylates and α,β-dialkylacrolein diacylates can be prepared by our new process. The α-alkylacrolein diacylates and the α,β-dialkylacrolein diacylates were unknown heretofore.

It is, accordingly, an object of our invention to provide a new process for preparing acrolein diacylates. A further object is to provide α-alkylacrolein diacylates and α,β-dialkylacrolein diacylates. Other objects will become apparent hereinafter.

In accordance with the invention, we prepare acrolein diacylates, α-alkylacrolein diacylates, β-alkylacrolein diacylates and α,β-dialkylacrolein diacylates by adding acrolein, α-alkylacroleins, β-alkylacroleins or α,β-dialkylacroleins to a mixture of an aliphatic carboxylic anhydride and an acid catalyst at a temperature of not more than 10° C. In practicing the invention, the carboxylic anhydride is advantageously stirred in a chilled container together with a small amount of an acid catalyst and the unsaturated aldehyde is slowly added with stirring. The unsaturated aldehyde and carboxylic anhydride react in an equivalent molar ratio. An excess of anhydride does not seem to improve the yield. After the unsaturated aldehyde has all been added at a temperature of not more than 10° C., the resulting mixture is advantageously allowed to stand at 20° to 25° C. for several hours. At the end of this time, any anhydride still present is advantageously neutralized by washing the reaction mixture with cold sodium bicarbonate solution followed by washing with cold water. The washed product can then be fractionally distilled in vacuo. The diacylates so prepared are clear water-white liquids with faintly sharp odors. They are stable in neutral media, but in acidic media they hydrolyze readily to yield acrolein compound and carboxylic acid.

We have found that acid catalysts such as hydrochloric acid or sulfuric acid, while entirely operable, are not as effective as acid salt catalysts, i. e. salts which give an acid reaction when mixed with water, e. g. stannous chloride, ferric chloride, zinc chloride, etc. We have found that stannous chloride is especially efficacious.

The following examples will suffice to illustrate the manner of practicing our invention and the new compounds obtainable thereby.

*Example 1.—α-Methacrolein diacetate*

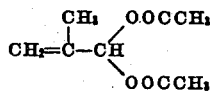

A suspension of stannous chloride (8 g.) in acetic anhydride (450 g., 4.4 mol.) was stirred in a flask set in an ice bath until the temperature of the suspension was below 10° C. Dry α-methacrolein (280 g., 4 mol.) was added dropwise to the mixture with stirring, while keeping the reaction mixture below 10° C. The addition of α-methacrolein was complete in about 2 hours. The reaction mixture, at first colorless, became yellow and finally red-brown in color and all the stannous chloride dissolved. The mixture was allowed to stand at 20° to 25° C. for about 10 hours. It was then washed successively with cold aqueous sodium bicarbonate and cold water until neutral. The resulting crude α-methacrolein diacetate was separated from the aqueous liquors (addition of a small amount of carbon tetrachloride to the mixture aided in a sharp separation). The crude product was then distilled in vacuo. 400 g. of pure α-methacrolein diacetate (58 percent yield) boiling at 100° C. at 21 mm. of mercury pressure were obtained. The density (20/20) of the product was 1.0512 and the refractive index (20/D) was 1.4256.

*Example 2.—α-Ethacrolein diacetate*

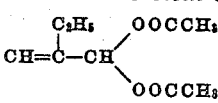

A suspension of stannous chloride (8 g.) in acetic anhydride (900 g., 9 mol.) was stirred in a flask set in an ice bath until the temperature of the suspension was below 10° C. α-Ethacrolein (340 g., 4 mol.) was added dropwise to the suspension with stirring, while keeping the temperature of the mixture below 10° C. The addition was complete in about 2 hours. The crude α-ethacrolein diacetate was isolated as in Example 1. Upon fractional distillation in vacuo, 593 g. (80 percent yield) of pure α-ethacrolein diacetate were obtained. The pure product boiled at 110° C. at 20 mm. of mercury pressure and had a density (20/20) of 1.0357 and a refractive index (20/D) of 1.4307. When only 4.4 mol. of acetic anhydride were used, the yield was about the same and neutralization of the reaction mixture was much less tedious.

Example 3.—Crotonaldehyde diacetate

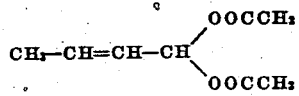

A mixture of 450 g. (4.4 mol.) of acetic anhydride and 8 g. of stannous chloride were treated as in Example 1 with 280 g. (4 mol.) of crotonaldehyde. The crude crotonaldehyde diacetate was isolated as in Example 1. Upon fractional distillation in vacuo, there were obtained 615 g. (89.5 percent yield) of pure crotonaldehyde diacetate boiling at 106° C. at 20 mm. of mercury pressure.

Example 4.—α-Methacrolein dipropionate 550 g. (4.23 mol.) of propionic anhydride mixed with 8 g. of stannous chloride were treated as in Example 1 with 280 g. of α-methacrolein. The crude α-methacrolein dipropionate was isolated as in Example 1. Upon fractional distillation in vacuo, 429 g. (53 percent yield) of pure α-methacrolein dipropionate boiling at 98° C. at 10 mm. of mercury pressure were obtained. This pure product had a density (20/20) of 1.0142 and a refractive index (20/D) of 1.14273.

Example 5.—Crotonaldehyde dipropionate 384 g. (2.96 mol.) of propionic anhydride mixed with 6 g. of stannous chloride were treated as in Example 1 with 190 g. (2.7 mol.) of crotonaldehyde. The crotonaldehyde dipropionate was isolated as in Example 1, except that the reaction mixture was neutralized with sodium hydroxide solution. The mixture became quite hot and an appreciable part of the product was hydrolyzed, resulting in a lower yield. Upon fractional distillation in vacuo, 182 g. (32 percent yield) of pure crotonaldehyde dipropionate boiling at 106° to 108° C. at 10 mm. of mercury pressure were obtained. This pure product had a density (20/20) of 1.0124 and a refractive index (20/D) of 1.4368.

Example 6.—α-Ethacrolein dibutyrate 248 g. (1.57 mol.) of n-butyric anhydride mixed with 3 g. of stannous chloride were treated as in Example 1 with 122 g. (1.45 mol.) of α-ethacrolein. The crude α-ethacrolein dibutyrate was isolated as in Example 1. Upon fractional distillation in vacuo, 244 g. (70 percent yield) of pure α-ethacrolein dibutyrate boiling at 114° to 115° C. at 7 mm. of mercury pressure were obtained. This pure product had a density (20/20) of 0.9743 and a refractive index (20/D) of 1.4337.

Example 7.—Tiglic aldehyde diacetate

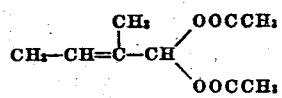

225 g. (2.25 mol.) of acetic anhydride mixed with 4 g. of stannous chloride were treated as in Example 1 with 170 g. (2.02 mol.) of tiglic aldehyde (α,β-dimethacrolein). The crude tiglic aldehyde diacetate was isolated as in Example 1. Upon fractional distillation in vacuo, 245 g. (66 per cent yield) of pure tiglic aldehyde diacetate boiling at 114° C. at 21 mm. of mercury pressure were obtained. This pure product had a density (20/20) of 1.0490 and a refractive index (20/D) of 1.4364.

Example 8.—Acrolein diacetate 205 g. (2.05 mol.) of acetic anhydride mixed with 0.5 mol. of concentrated sulfuric acid were treated with 112 g. (2.0 mol.) of acrolein as in Example 1. The mixture was stirred for a half-hour after all the acrolein had been added, then was allowed to stand at room temperature for five hours. Three g. of sodium acetate were added to neutralize the sulfuric acid catalyst, and the mixture was fractionated in vacuo. A 76 percent yield of the acrolein diacetate was obtained.

In a manner similar to that illustrated in the above examples, other diacylates, such as tiglic aldehyde dipropionate, α-ethacrolein dipropionate and α-methacrolein dibutyrate, can be prepared. Diesters can be prepared from these various acrolein compounds and mixed anhydrides, such as acetic-propionic anhydride.

What we claim as our invention and desire to be secured by Letters Patent of the United States is:

1. The α-alkylacrolein diacylates selected from the group consisting of α-ethacrolein diacetate, α-ethacrolein dipropionate and the α-ethacrolein dibutyrates.

2. α-Ethacrolein dibutyrate.

3. α-Ethacrolein diacetate.

JOSEPH H. BRANT.
FREDERICK R. CONKLIN.